Figure 1A:
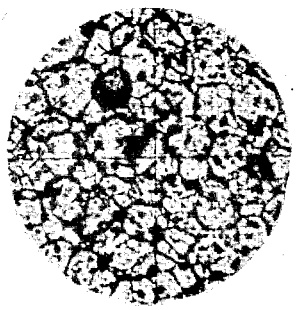

INVENTOR
LESLIE W. AUSTIN
BY

Patented Oct. 16, 1951

2,571,101

UNITED STATES PATENT OFFICE 2,571,101

MAGNESIA REFRACTORY

Leslie W. Austin, San Jose, Calif., assignor to Kaiser Aluminum & Chemical Corporation, a corporation of Delaware Application October 1, 1948, Serial No. 52,211

11 Claims. (Cl. 106—58)

The present invention pertains to an improved magnesia refractory material, and it relates particularly to a novel arrangement of the constituents of the refractory material, which arrangement imparts greatly improved characteristics thereto.

This invention is a continuation-in-part of copending applications S. N. 744,893 and S. N. 755,928, filed April 30, 1947 and June 20, 1947, respectively, the latter now U. S. Patent No. 2,487,290, November 8, 1949, which describe processes useful in preparing magnesia materials having the structure required by the present invention.

A primary object of this invention is to provide a crystalline magnesia refractory material in which the surfaces of the magnesia crystals are, in effect, free of a film of dissimilar material. The invention has for one object the provision of magnesia refractories having greatly increased resistance to deformation under load at high temperatures. A further object is the provision of magnesia refractories possessing increased resistance to thermal spalling. Another object is the provision of such magnesia refractories having unusual resistance to the penetration and slagging effects of many metals, slags, and fluxing oxides.

The ultimate object of the invention is the provision of magnesia-bearing refractories possessing such greatly improved characteristics as to give them utility even in newly developed thermal processes operating up to 4000° F. or more. Other objects and advantages of the invention will be apparent from the description below.

Magnesium oxide in its pure state is one of the most refractory oxides, melting at approximately 2800° C., and it is the most refractory of the oxides readily available in high purity. However, perhaps because of its refractoriness, magnesium oxide has been difficult to sinter or crystallize into a strong grain material of high density and large particle size suitable for refractory manufacture. In order to provide such grain material from magnesia it has heretofore been deemed necessary to employ admixtures of various fluxing oxides or sintering aids to allow sintering to take place at fairly easily attainable temperatures, or to employ a difficult and expensive process of electrical heating or fusion.

While these processes have achieved their end of providing a grain material which was of useable particle size and physically strong at low temperatures, the high temperature refractory performance of the material was greatly limited by the resulting structure produced in the grain material itself. When such grain material is examined in thin section by the aid of the petrographic microscope it is seen to consist principally of crystals of magnesium oxide surrounded and held apart by a continuous film or a matrix of the impurities. These impurities are generally present in the form of ferrites, aluminates or silicate minerals of the type of forsterite, monticellite, gehlenite, akermannite, or the like, or mutual solutions of some of these. It is the arrangement of the crystals of magnesia with respect to each other and to the accessory minerals which is herein referred to as the "structure" of the refractory material.

Silicate matrix systems have a marked tendency to form glasses, and although such systems may include a high proportion of crystalline material the crystals are apt to be imbedded in a glassy phase. The glasses tend to be characterized by relatively low melting points and low resistance to thermal shocks. Furthermore, the glasses constitute eutectics which have increasing solubility for the crystalline magnesia as the temperature rises above the lowest melting point of the system. This solution effect leads to the production of increasing amounts of liquids, under rising temperatures, with failure of the refractory grain structure as the ultimate result. During the initial stage in burning the magnesia to effect its crystallization, the liquids have a function in promoting the growth of the individual magnesia crystals and allowing their agglomeration into large grains by a "snow-ball" action when the firing is carried out in a rotary kiln. At the same time the individual crystals are coated by the matrix so that the actual surface presented to the outside world reflects the qualities of the matrix rather than of the pure magnesia. And the properties of the resulting grains accordingly are dependent more upon the properties of the matrix than upon those of the crystalline magnesia per se. Calcium or aluminum ferrites have an effect similar to the silicates in aiding in the crystallization and sintering of magnesia, and they also appear to result in low resistance to spalling.

The greatest fault of the magnesia refractory structure just described has not in the past been recognized as a fault; in fact, it has been regarded as an advantage and as a necessary feature of a useable magnesia refractory material. The fault referred to is the continuous matrix structure of impurities surrounding the magnesium oxide crystals. Magnesium oxide has a cubic or octahedral crystal habit and consequently has no tendency to produce an interlocking or "felted" crystal structure. Therefore, it has been thought necessary to provide a sort of binder or intercrystalline mortar to tie the magnesia crystals together and prevent their crumbling apart or otherwise deforming under load. This thinking has prevailed, and efforts to improve magnesia refractory material have been directed at improving the characteristics of the bonding matrix. Apparently these efforts had succeeded in producing magnesia materials generally useful in metallurgical processes at moderately high temperatures, although the poor resistance to thermal spalling and to deformation under load at temperatures in excess of 1500° C. were notorious. In the past it was thought that these deficiencies were inherent in the magnesia and its type of crystallization; whereas, actually, the failing now appears to lie more in the presence of the bonding matrix.

According to the present invention, a magnesia refractory material is provided in which the continuous matrix of impurities, or of dissimilar substances, is substantially eliminated; and this material consists of magnesia crystals having a least a part, and usually a substantial portion, of their surfaces or boundaries free of a film of dissimilar material. Preferably, a major proportion, at least 50%, of the crystal surfaces are free of a film of dissimilar material. In the magnesia refractory material the impurities or dissimilar substances are dispersed as a discontinuous phase, or are segregated into discrete and discontinuous zones. As can be observed upon microscopic mineralogical investigation, the dissimilar substances are present as a discontinuous phase, in minor proportion as compared with the magnesia, and they do not enclose the magnesia crystals as a continuous film thereabout. The refractory material is dense and of low porosity. It contains not more than 2.0% of silica and advantageously at least 95.0% of magnesium oxide.

Attached Figures 1 and 4, a and b views, are photomicrographs of thin sections of magnesia refractory materials of the present invention. Figures 2 and 3, a and b views, ar photomicrographs of thin sections of magnesia materials according to the prior art.

The magnesia refractory material of this invention can be prepared in several ways, as described in more detail below. Thus it can be prepared by firing magnesia-yielding material, of such purity as to contain on the ignited basis at least 95.0% magnesium oxide and not more than 2.0% silica, at a high temperature, that is, at 2000° C. or above, but without fusion, until crystallization is complete. The magnesia material can also be prepared by admixing with magnesia-yielding material of the above purity at least one agent chosen from the group containing elements of the fourth series of Mendeleeff's Periodic Table having atomic numbers 22 to 26 and postulated in the literature as having from 12 to 16 total electrons in the two outer shells, and compounds of these elements.

The magnesia rafractory material of this invention can be advantageously employed as an aggregate or grain material in refractory applications. The structure of this invention can also be employed as a bond between non-acid refractory grains or aggregates, such as periclase, corundum, spinels of high melting point such as chromite, magnesio-chromite, magnesium aluminate, and picotite, and the like, particularly where advantage is taken of the ability to bond directly to and between magnesia crystals themselves and without interposition of a dissimilar film. Naturally, when dissimilar materials are bonded by the magnesia refractory structure the service temperature should be kept below a temperature of destructive reaction between the magnesia and the aggregate. In the substantial absence of impurities, particularly silica, the examples cited here are compatible with magnesia to temperatures well in excess of ordinary service conditions.

In order to avoid detrimental effects upon the desired refractory structure arising from migration of silica thereinto at high temperature, the refractory aggregate should contain less than 2% of $SiO_2$ particularly in the finely divided portion or when the silica is uniformly distributed. It has, however, been found operable in certain cases to employ coarse aggregate, i. e. those portions retained on a 40-mesh Tyler screen, containing up to about 6% $SiO_2$, when the silica occurs in relatively coarse segregations of secondary components. An example of this latter case is the use of a coarse chromite as part of the aggregate, the chromite containing relatively coarse serpentine as a secondary component and containing by analysis up to 6% $SiO_2$, which is introduced by the serpentine. However, with such materials load bearing ability above about 1800° C. may be limited.

What had not been known previously, and it is upon this discovery that this invention in major part is based, is the fact that greatly improved performance can be obtained from a magnesia refractory material in which the continuous matrix of impurities has been substantially eliminated and in which a structure is provided comprising magnesium oxide crystals having a substantial portion of their surfaces free from a film of impurities, the residual impurities being segregated into more or less discrete and discontinuous zones which are generally smaller than and do not enclose the magnesia crystals.

The contrast between the new structure and the previously known material may be pointed out by comparing the actions of each under rising temperatures. At ordinary temperatures the continuous matrix structure is strong, but as the temperature approaches the softening point of the matrix—which temperature may be from about 1200° C. to 1650° C.—the matrix becomes no longer a rigid bond but rather a lubricant, and the whole structure may then be deformed by a small stress. In contrast to the materials of the art, at and beyond this point the new structure remains relatively rigid, because continuous "lubricating" films are not present between the refractory magnesia crystals. Thus, the new structure maintains a useable strength to a much higher temperature, for example, to 1800° C. to 2000° C. or even higher.

It has been found that under identical severe spalling tests the average commercial chemically bonded magnesia refractory suffers a 24.1% loss, the best previously known chemically bonded magnesia refractory loses 18.2%, whereas a typical chemically bonded magnesia refractory comprising the structure of the invention loses only 2% by weight. The foregoing serve to illustrate some of the advantages to be obtained by following the teaching of the invention.

A typical analysis of the above new refractories is as follows: $SiO_2$, 1.25%; CaO, 1.29%; $Al_2O_3$, 0.20%; $Fe_2O_3$, 0.30%, $Cr_2O_3$, 1.00%; and MgO, 95.96% by difference.

In an experimental installation, periclase refractories comprising the structure of the invention have operated continuously for more than two months at temperatures in excess of 3700° F. (2040° C.) with no failure or shut-downs due to the refractories.

The structure of the prior magnesia grain materials had as a bond between the crystals which comprise the grains a heterogeneous system; magnesia-to-matrix-to-magnesia, whereas the new structure has a direct magnesia-to-magnesia bond.

As one possible explanation of the improved results obtained by the invention it may be reasoned that the intra-crystalline bonds in crystalline magnesia are extremely strong or stable, as witnessed by the great refractoriness of the material. Or stated another way, the tendency of magnesia to maintain its crystal lattice structure is so great that extreme thermal agitation is necessary, i. e. a temperature of about 2800° C., before the lattice bonds weaken sufficiently to allow the magnesia to melt. It is believed, therefore, that if the inter-crystalline bonds between the individual magnesia crystals which make up a grain of refractory material can be made to approach the strength of the lattice bonds inside the crystals, then the whole grain structure is very greatly improved and the true characteristics of magnesia are more nearly realized. It is postulated that such a result is obtained when the usual matrix is limited at least to the extent that the films around the magnesia crystals become discontinuous, and direct magnesia-to-magnesia contact and bonding are enabled.

It has further been found that under conditions effecting such results recrystallization of the magnesia material takes place more readily, leading to better development of the crystalline structure and to a higher stability of the material.

Further, the increased tendency to bond magnesia to magnesia has led to stronger bonding into refractory shapes of the magnesia grains resulting from this invention. And the substantially free magnesia surfaces have been found to be very well adapted to bonding by synthetic spinel-type minerals, a bonding action which apparently is not possible with the customary magnesia grains comprising matrix-coated crystals. Apparently the matrix film, particularly in the case of a silicate matrix, seals off the surfaces of the magnesia crystals in the structure of the prior art so that these surfaces are, in effect, not available for bonding either directly, magnesia to magnesia, or by spinel-type minerals, and as a result many of the possible benefits of magnesia as a refractory material have heretofore remained unrealized.

Another advantage of the magnesia refractory material provided by the invention is its greatly increased resistance to fluxing or penetration by oxides and other minerals which are destructive to the ordinary magnesia refractories at high temperatures. Such agents include slags, silicates, oxides of iron, lead, copper, and other metals, alkalies, and the like. It is thought that this very marked improvement in resistance to such reagents may be due to the lack of continuous impurity films in the new material. It is postulated that penetration and attack in the known materials has been brought about or at least hastened by reaction of the fluxing agents with the bonding matrix film with consequent lowering of the melting point, viscosity, and surface tension of this film, and an actual soaking up of the fluxes into the intercrystalline spaces by an action analogous to capillarity. The more-fluid films thereupon have a higher solubility for magnesia—as well as a weaker bonding ability at elevated temperatures—and the attack proceeds into the refractory material. In contrast, in the material of the invention the "capillarity" is very strictly limited because there are no continuous matrix films, to be attacked by fluxes, and any attack must take place substantially only on the exposed surface of the refractory material.

The poor resistance to thermal spalling evidenced by refractories composed primarily of magnesia as heretofore available has long been notorious. However, with the grain material provided by the invention an improvement in spalling resistance has been found, to the extent that the characteristics of the best chrome-magnesia refractories have been equalled or in some cases exceeded by refractories consisting of the new magnesia. Furthermore, improvement is noted in chrome-magnesia refractories when the new magnesia material is substituted for the known, matrix-bonded, materials. This improvement is thought to arise, again, from the substantial elimination of the continuous matrix or bonding film from the refractory grain structure. It is known that magnesia and the various impurities comprising the films have very different rates of thermal expansion. It is reasoned, therefore, that under fluctuations in temperature the bond between magnesia crystal and matrix is stressed first in one direction and then in another until eventually a "fatigue" develops and the bond is weakened to the extent that failure occurs. In the new structure provided by the invention, with the substantial elimination of the continuous matrix, differential thermal stresses in the intercrystalline zones are eliminated or at least greatly minimized, and the spalling resistance is increased accordingly. Spalling may also arise in the prior structure from phase changes in the matrix due to freezing or thawing of components melting below the top service temperature of the refractory. Such spalling is also overcome by the substantial elimination of the continuous matrix.

Magnesia refractory materials of the prior art, even when described as "pure magnesias," have embodied matrices of various types usually comprising silicates, calcium ferrite or iron or calcium aluminates. It is obvious that the matrix in a magnesia refractory could comprise single minerals or combination of them, often in the form of glasses. Furthermore, the different minerals singly have different tendencies to form a continuous matrix.

Silica appears to be the impurity commonly present in commercial magnesias which has the greatest tendency to form a continuous matrix or to continuously coat the magnesia crystals. Silica is also undesirable for the reason that it combines with all of the other common impurities, i. e. lime, alumina, and iron oxide, to form additional amounts of matrix. Lime also tends to combine with alumina and iron oxide as well as with silica to form a matrix. From microscopic examination of thin sections it appears that silica and lime should be limited to a maximum of about 2% each in magnesia of technical purity, i. e. analysing 95% or more MgO, in order to avoid formation of a continuous matrix. With purer magnesia, in respect to other impurities, slightly larger amounts of silica or lime may be tolerated. Except in special cases it is deemed best to maintain the limits of at least 95% MgO, not over 2.0% SiO₂, and preferably not over 2.0% CaO in order to insure that the magnesia employed will meet the requirement that the crystalline structure comprise magnesium oxide crystals having a substantial proportion of their surfaces free from impurities. This last is the controlling requirement: That magnesia crystal surfaces free from impurity films be available for bonding, and it has been found in practice of the invention that such a structure may be provided from magnesia of the above purity. It should be understood that since the various impurities interact with each other and with magnesia in varying degrees, the tendency to form a continuous matrix or impurity phase will depend upon which impurities are present and in what proportions. For example, when all impurities but one are substantially absent, more than the maximum amounts shown may be employed without departing from the structure of the invention. Preferably, less than 5.0% of dissimilar materials, i. e. substances other than magnesium oxide, are present in the refractory material. It is also preferred that B₂O₃ when present be not in excess of about 0.5% in magnesia containing other impurities within the limits of the above chemical specification, since more than this may inhibit the formation of the desired structure, in some cases. It is further necessary that the firing of the magnesia be carried out properly to develop the desired structure. Beside the methods of making the structure described in this specification, further methods and modifications are shown in the co-pending applications referred to in more detail below. The firing of the magnesia is done under conditions which allow the magnesia crystals to be well-developed and the impurities to become segregated into discrete and discontinuous zones so that at least a substantial proportion of the magnesia crystal surfaces is free from films of dissimilar substances.

It has been found that satisfactory magnesia refractory material according to the invention has been well crystallized, the crystal dimensions being of the order of from 10 to 250 microns, and in the majority of instances ranging from about 20 to 50 microns. Magnesia refractory materials having crystal dimensions of the order of 10 microns or less have generally been found to have undesirably high porosity, residual shrinkage and deformation under load at high temperatures. Fused magnesias generally have been found to have crystal dimensions of the order of 800 to 5000 microns or even larger.

Given suitable starting material, the structure of the invention may be imparted to magnesia in various ways. For example, it may be brought about as shown in S. N. 744,893 of April 30, 1947, by firing a magnesia-yielding source of suitable purity to a very high temperature, of the order of 2000° C. or more, for sufficient time to allow the recrystallization to take place but with avoidance of fusion. Fusion of the material appears to be undesirable for the best results, because except in cases of extreme purity it results in continuous films about the large magnesia crystals, and/or because fused magnesia gives hot load test results which are inferior to crystalline magnesia prepared without fusion as pointed out in S. N. 744,893. It is believed that the molecules in a crystal of fused magnesia may have reached such a stable crystal lattice configuration that they are less available for bonding than those in a crystal which has been formed in the solid state and which is therefore presumed to be less perfectly crystallized. A typical analysis of material having the structure of the invention as produced in accordance with S. N. 744,893 is: MgO, 96.4; CaO, 1.57; SiO₂, 1.19; Al₂O₃, 0.19; Fe₂O₃, 0.35; undetermined, 0.3%.

The improved magnesia structure may also be prepared at lower temperatures by the employment of small amounts of certain impurities which appear to have a catalytic effect upon the crystallization. S. N. 755,928, filed June 20, 1947, discloses and claims the process of crystallizing magnesia through the incorporation of an amount of chromium compound sufficient to yield less than 2% Cr₂O₃ in the fired analysis. Besides the method described in S. N. 755,928 there is a series of elements, having a similar action with magnesia, which are comprised in series 4 of the Mendeleeff Periodic Table, having atomic numbers from 22 to 26 inclusive. These elements or their compounds are said to have a "catalytic" effect on the crystallization of magnesia because such small amounts are effective to increase the density and the size of crystals, and because certain critical larger amounts have less or no effect. Compounds of lead and copper are also useful. The action is not that of the usual fluxing or sintering agents, as such agents are employed in larger amounts and increase the effect with increased additions. Furthermore, such agents, as employed in the art, lead to the formation of continuous matrices and reduce the refractoriness under load of the magnesia, whereas the above listed "catalysts," employed in amounts to give an analysis of less than 2% of the respective oxides in the fired material, do not reduce the refractoriness appreciably and do not produce continuous matrices in magnesia analysing at least 95% MgO and not over 2% SiO₂. The term "catalyst" as used herein is not strictly used in the usual sense, since it is not known definitely that the respective agents bring about their effect on the crystallization without being altered themselves, and they are not, of course, recovered after the action. It is believed that chrome and iron oxides at least, and probably the rest of these agents, may enter into solid solution in the magnesia at least in part.

The "catalytic" action has been demonstrated on a wide variety of magnesia sources, including magnesium hydroxide and magnesium carbonate, magnesium alcoholate, hydrated magnesia and uncrystallized or crypto-crystalline magnesia.

The preferred method of securing such catalytic action is to add the agent as a solution in an aqueous suspension of the magnesia-yielding material. Such solution and suspension are beneficial but not essential to the action, being preferred merely as a means of securing the best dispersion of the catalytic agent in the magnesia. Improvement in crystallization over the untreated MgO has been secured by interdispersing the dry finely powdered oxides or compounds in the dry magnesia source prior to burning.

Figure 1B:
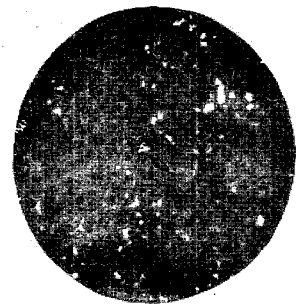

Figure 1 shows a typical magnesia product according to the invention prepared by admixing to precipitated magnesium hydroxide, in the form of a slurry, and sufficient chromic acid, CrO₃, to yield in the analysis of the fired material ¼% Cr₂O₃, drying the mixture, compacting the dry material under pressure, and firing to a top temperature of 1700° C. for one-half hour. Figure 1a is a photomicrograph of a thin section of the product, taken with plane-polarized light, at a magnification of 260 diameters. Figure 1b is a photomicrograph of the same field and at the same magnification taken with crossed nicols. From Figure 1a it may be seen that the magnesium oxide crystals are well developed and have at least a substantial proportion of their surfaces free from a film of dissimilar material and that where present such films are thin and discontinuous. Figure 1b shows the dispersal of the dissimilar material into separate and discrete zones between the magnesia crystals. As is well known, magnesium oxide crystals are isotropic and consequently are only faintly seen in mineralogical examination with crossed nicols, whereas silicate minerals are birefringent and, except when oriented in certain critical directions with respect to the nicol prisms, cause light to be transmitted in spite of the crossed nicols. Consequently, it may be confirmed by studying the thin section with nicols crossed, as shown in Figure 1b, that the dissimilar materials have been segregated into discontinuous zones and that at least a substantial proportion of the magnesia crystal surfaces are free from films of dissimilar material.

Figure 2A:
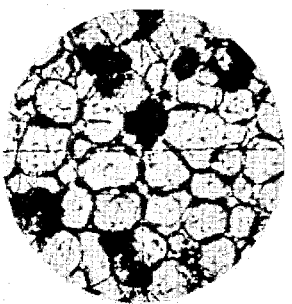
Figure 2B:
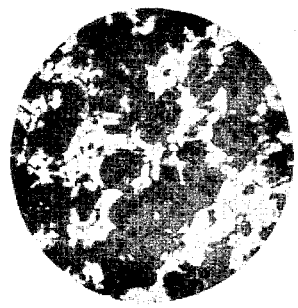

In contrast to Figure 1, Figure 2a is a photomicrograph taken with plane-polarized light at 260 diameters of a thin section of a non-fused magnesia grain material of the highest purity generally available commercially according to the prior art and which material contains about 95% MgO and 3% $SiO_2$, and Figure 2b is a photograph of the same field at the same magnification taken with crossed nicols. It is readily apparent that thicker and substantially continuous matrix films are present in the material shown in Figure 2 in contrast to the structure according to the invention shown in Figure 1. The continuity of the matrix films of Figure 2a is confirmed by study of the same field under crossed nicols, as shown in Figure 2b, it being borne in mind that upon rotation of the microscope stage certain areas that appear dark in the photograph become illuminated.

Figure 3A:
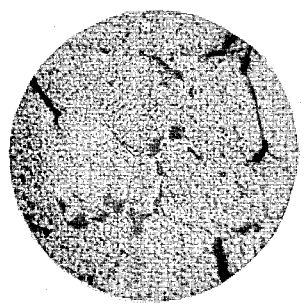
Figure 3B:
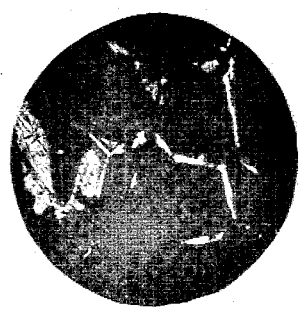

Figures 3a and 3b are photomicrographs of electrically fused magnesia prepared according to the prior art and containing more than 99% magnesia and less than 1% silica. The magnification is 76 diameters, and Figure 3a is taken with plane-polarized light while 3b shows the same filed with crossed nicols. The figures show the different type of crystallization obtained by fusing the magnesia and also the thick crystal boundaries. Figure 3b shows that the crystal boundaries are largely filled or coated with impurities.

Figure 4A:
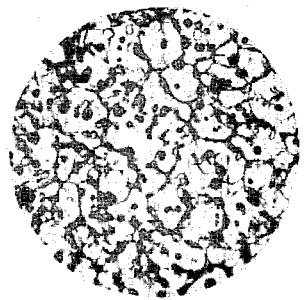
Figure 4B:
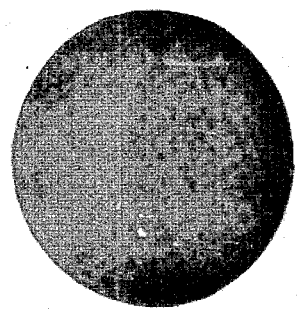

Figure 4 illustrates another example of magnesia refractory material according to the invention. This well crystallized magnesia was prepared with the aid of catalytic amounts of alumina as follows: Precipitated magnesium hydroxide in the form of a slurry in water was intimately mixed with sufficient aluminum hydroxide, prepared by the Bayer process, to yield 0.5% additional $Al_2O_3$ in the fired product. The mixture was then dried, powdered, formed into shape at high pressure, e. g. 3000 to 10,000 pounds per square inch, and fired to 1700° C. for thirty minutes. Figure 4a is a photomicrograph at a magnification of 260 diameters of a thin section of the product as seen under plane polarized light. Figure 4b shows the same field with crossed nicols. It may be seen that the impurities exist as discrete and discontinuous segregations and that there is a substantial absence of matrix film on the magnesia crystals. A typical analysis of this product is as follows: 1.29% $SiO_2$, 1.09% CaO, 0.70% $Al_2O_3$, 0.30% $Fe_2O_3$, and 96.62% MgO (by difference).

In conformity with common practice in reporting chemical analyses of refractory materials, in the specification and claims, the proportions of the various chemical constituents present in a material are given as though these constituents were present as the simple oxides. Thus, the magnesium constituent is referred to as magnesium oxide or MgO, the silicon content as silica, silicon dioxide or $SiO_2$, and so on for other elements reported, although the silica or chrome or other element or oxide may be present in combination with a very small proportion of the MgO, or with each other. That is to say, the term "2.0% of $SiO_2$," or "of silicon expressed or calculated as $SiO_2$" is intended to mean that a chemical analysis of the material referred to would show the silicon content as $SiO_2$, whereas in reality all of the silicon might be present in the form of forsterite or in some other combined form. Percentages given in this specification and in the appended claims are percentages by weight unless otherwise stated. The term "unfused" or "non-fused," employed herein, is intended to describe a solid material, for instance magnesia, which has been heated to less than its fusion temperature, or which has been well-crystallized without melting or fusion.

What is claimed is:

1. Dense, non-fused magnesia refractory material containing at least 95% of magnesium oxide and not over 2.0% silica and consisting of magnesium oxide crystals, a major proportion of the surfaces of said crystals abutting directly upon and bonded to the surfaces of other magnesia crystals, and a less than 5 percent of impurities, said impurities being dispersed in said aggregates in discrete, discontinuous zones.

2. Non-fused periclase structure consisting of magnesia crystals predominantly bonded directly to the surfaces of other magnesia crystals and less than 5.0% of impurities, said impurities being dispersed in said structure in discrete, discontinuous zones.

3. As a bond for non-acid refractory grain material, non-fused synthetic periclase structure consisting of magnesia crystals, a major proportion of said crystals being bonded directly to the surfaces of other magnesia crystals, and less than 5% of impurities dispersed in discrete, discontinuous zones through said structure, said periclase structure containing at least 95% of magnesium oxide and not over 2.0% of silica.

4. Dense, non-fused refractory grain containing at least 95.0% of magnesium oxide and not over 2.0% of silica and consisting of magnesium oxide crystals and less than 5% of impurities, said impurities being dispersed in discrete, discontinuous zones therethrough, at least 50% of the surfaces of said magnesium oxide crystals abutting upon and bonding to surfaces of other magnesium oxide crystals.

5. Non-fused periclase structure consisting of magnesia crystals predominantly bonded directly to the surfaces of other magnesia crystals and less than 5% of impurities, said impurities being dispersed through said structure in discrete, discontinuous zones, and less than 2% of oxides of the impurities in solid solution in said magnesia crystals.

6. Dense, non-fused refractory grain containing not over 2.0% of silica and not over 2.0% of CaO, and consisting of magnesium oxide crystals and not over 5% of impurities, said impurities being dispersed through said grain in discrete, discontinuous zones, and at least 50% of the surfaces of said magnesium oxide crystals abutting upon and bonding to the surfaces of other magnesium oxide crystals.

7. Dense, non-fused refractory grain of magnesia crystals and containing at least 95.0% of magnesium oxide, not over 2.0% of CaO, and not more than 2.0% of silica, the surfaces of said crystals being at least partially free of a film of matrix material.

8. Dense, non-fused refractory grain consisting of magnesia crystals and not over 5% of impurities, a major proportion of the surfaces of said magnesia crystals being free of a film of said impurities and said impurities being dispersed through said grain in discontinuous phase, said grain containing not over 2.0% of silica and not over 2.0% of CaO.

9. Dense, non-fused refractory grain consisting of magnesia crystals and not over 5% of matrix material, said matrix material being dispersed through said grain in discontinuous phase and at least 50% of the surfaces of said magnesia crystals being free of a film of said matrix material, said grain containing not over 2.0% of silica.

10. Dense, non-fused refractory grain containing at least 95% of magnesium oxide, not over 2.0% of CaO, and not over 2.0% of silica, and consisting of magnesia crystals and a less than 5% of impurities, a major proportion of the surfaces of said magnesia crystals being free of a film of said impurities and said impurities being dispersed in said grain as discontinuous phase.

11. Non-fused periclase structure comprising at least 95% of magnesium oxide, not over 2.0% of CaO, not over 2.0% of silica, and not over 0.5% $B_2O_3$, and consisting of magnesium oxide crystals predominantly bonded directly to the surfaces of other magnesium oxide crystals and not over 5.0% of impurities including said silica, said CaO, and said $B_2O_3$, said impurities being dispersed in said structure in discrete, discontinuous zones.

LESLIE W. AUSTIN.

REFERENCES CITED

The following references are of record in the file of this patent:

FOREIGN PATENTS

| Number | Country | Date |
|---|---|---|
| 13,697 | Great Britain | 1909 |
| 142,721 | Great Britain | 1920 |

OTHER REFERENCES

Searle: Refractory Materials (1924), pgs. 182, 188, 383, 384.